United States Patent [19]

Sipsas et al.

[11] Patent Number: 5,376,698
[45] Date of Patent: Dec. 27, 1994

[54] POLYOLEFIN COMPOSITIONS CONTAINING COATED MICA PARTICLES TO PREVENT YELLOWING AND METHODS THEREFORE

[75] Inventors: Ioannis P. Sipsas, Forest Hills; Brian Mullaney, Bloomingburg; Leigh A. Kelderhouse, Yorktown Heights, all of N.Y.

[73] Assignee: The Mearl Corporation, Ossining, N.Y.

[21] Appl. No.: 125,108

[22] Filed: Sep. 21, 1993

[51] Int. Cl.$^5$ .............. C08L 23/00; C08K 9/02; C08K 3/36; C08K 5/13
[52] U.S. Cl. .................. 523/200; 523/307; 524/323; 524/351; 524/449; 524/543; 260/998.17; 106/417
[58] Field of Search ............... 523/200, 307; 524/449, 524/543, 351, 323; 260/998.17; 106/417

[56] References Cited

U.S. PATENT DOCUMENTS

| 3,711,308 | 1/1973 | Brand et al. | 106/417 |
| 4,537,636 | 8/1985 | Bernhard et al. | 106/417 |
| 5,165,915 | 11/1992 | Tokubo et al. | 424/63 |

FOREIGN PATENT DOCUMENTS

| 3237264 | 4/1984 | Germany | 106/417 |
| 3118373 | 5/1988 | Japan | 523/200 |

*Primary Examiner*—Paul R. Michl
*Assistant Examiner*—Andrew E. C. Merriam
*Attorney, Agent, or Firm*—Ostrolenk, Faber, Gerb & Soffen

[57] ABSTRACT

Antioxidant containing polyolefin compositions are provided including titanium dioxide-coated mica particles comprising a coating of silica and alumina calcined thereon to prevent yellowing of the compositions. Process for preventing the yellowing of antioxidant containing polyolefin compositions is also disclosed.

23 Claims, No Drawings

POLYOLEFIN COMPOSITIONS CONTAINING COATED MICA PARTICLES TO PREVENT YELLOWING AND METHODS THEREFORE

BACKGROUND OF THE INVENTION

1. Field of the Invention

The present invention relates to anti-oxidant containing polyolefin compositions including titanium dioxide-coated mica particles with a coating of silica and alumina calcined thereon to prevent yellowing of the polyolefin compositions.

2. Description of the Prior Art

Many pearlescent or nacreous pigments are based on micaceous substrates which have been coated with a metal oxide layer. As a result of reflection and refraction of light, these pigments exhibit pearl-like luster and depending on the thickness of the metal oxide layer, they can also exhibit interference color effects.

Among the pearlescent pigments encountered most often on a commercial basis are titanium dioxide-coated mica pearlescent pigments. However, often such pigments are incompatible with the polyolefin compositions in which they are incorporated. For instance, inorganic pigments, such as titanium dioxide-coated mica pigments, frequently cause yellowing of anti-oxidant containing polyolefin compositions in which they are contained.

U.S. Pat. No. 4,209,430 relates to a process for suppressing yellowing in thermoplastic polyolefins containing a phenolic anti-oxidant and $TiO_2$ pigment by adding a phosphorylated polyene either directly to the polyolefin or as a coating on the pigment.

U.S. Pat. No. 4,357,170 reviews various solutions to the problem of yellowing of titanium dioxide pigments in polymeric compositions such as polyethylene in the presence of additives such as phenolic antioxidants.

U.S. Pat. No. 4,494,993 relates to a pigment in which a homogeneous mixture of titanium dioxide, silicon dioxide and aluminum oxide is coated on mica flakes.

It has been found that the prior art solutions to the yellowing of anti-oxidant containing polyolefin compositions are not totally effective. Some yellowing of the polyolefin compositions can still be seen. Therefore, it is desirable to develop a titanium dioxide-coated mica containing polyolefin composition which avoids the disadvantages of the prior art described above, affording the advantages of substantially improving control of the yellowing phenomena frequently encountered.

It is accordingly an object of this invention to provide anti-oxidant containing polyolefin compositions including titanium dioxide-coated mica particles having a coating of silica and alumina calcined thereon to prevent yellowing of the polyolefin composition. Another object of the present invention is to provide a method of preventing the yellowing of an anti-oxidant containing polyolefin composition.

These and other objects of the invention will become apparent to those skilled in this art from the following detailed description.

SUMMARY OF THE INVENTION

This invention relates to anti-oxidant and titanium dioxide-coated mica containing polyolefin compositions and more particularly to such polyolefin compositions in which the titanium dioxide-coated micaceous pearlescent pigments include a coating of silica and alumina calcined thereon.

The invention also provides a process for preventing the yellowing of a polyolefin composition, which comprises mixing titanium dioxide coated-mica particles having a coating of silica and alumina calcined thereon with an antioxidant and a polyolefin.

DETAILED DESCRIPTION OF THE INVENTION

Titanium dioxide-coated mica pearlescent pigments are well known in the art. They are generally formed by depositing a hydrous titanium compound on a mica substrate and calcining to produce the titanium dioxide-coated mica pigment. Any of the titanium dioxide-coated mica pigments known heretofore can be used in the practice of the present invention.

Preferably, a mica substrate is coated with hydrous titanium dioxide. The titanium dioxide-coated substrate may then be calcined.

The titanium dioxide-coated mica pigments include anatase and rutile forms of titanium dioxide. Both forms can be treated with a coating of silica and alumina according to the present invention to prevent the yellowing of the polyolefin compositions in which they are contained. Various particle sizes of the titanium dioxide-coated mica pigments may be coated with the silica and alumina coating. For example, pigments with an average particle size from $10\mu$ to $50\mu$ may be coated with the silica and alumina coating. Particle sizes outside this range can also be treated.

The titanium dioxide-coated mica pigments which can be treated with a coating of silica and alumina include the white pearl titanium dioxide-coated micas. Also, interference pigments can be used. Interference pigments are pigments in which the thickness of the titanium dioxide layer on the mica causes the film to act as an optical filter, and interference colors are observed. Pigments such as interference yellow, red, blue and green may be used or any intermediate colors.

The titanium dioxide-coated mica pigments also may contain ingredients added thereto to improve the durability characteristics or other properties of the pigments. Thus, the titanium dioxide-coated mica pigments may contain various oxides such as tin oxide, chromium oxides and the like.

A wide variety of polyolefins are well known in the art and are suitable for being pigmented by the coated titanium dioxide-coated mica pigments of this invention. Illustrative of such polyolefins are the following: polyethylene, polypropylene, polybutadiene, and the like. The foregoing list is merely for illustration and not by way of limitation.

Conventional anti-oxidants typically used in polyolefin compositions include, for example, alkylated phenols, substituted benzophenones, thiobisphenols, polyphenols, and the like and mixtures thereof. Exemplary antioxidants include 2,6-di-tertiary-butyl-para-cresol, 2,2'-methylenebis (4-methyl-6-tertiary-butylphenol) 4,4'-methylenebis (2,6-di-tertiary-butylphenol), 4,4'-thiobis (6-tertiary-butylorthocresol), and the like.

A wide variety of conventional additives may also be included in the polyolefin compositions as is necessary, desirable or conventional. Such additives include catalysts, initiators, blowing agents, UV stabilizers, organic pigments including tinctorial pigments, plasticizers, leveling agents, flame retardants, anti-cratering additives, and the like.

Testing was performed by incorporating the silica and alumina coated titanium dioxide-coated mica in high density polyethylene (HDPE) step chips with an antioxidant, butylated hydroxytoluene (BHT), and exposing the step chips in a QUV meter. The yellowing which occurred was monitored by obtaining the Yellow Index as measured on a Hunter LabScan meter.

The pigment under test was first blended at 1% concentration based on the weight of the resin with pellets of high density polyethylene (HDPE) in a P-K (Paterson-Kelley) blender. 0.3% butylated hydroxytoluene was added and blended. A charge of 200 g was used. The resin containing the treated titanium dioxide-coated mica and the BHT was then injection molded into step chips. These step chips were then exposed in a QUV meter for a total of 96 hours. The Yellow Index was then measured on a Hunter LabScan instrument. The higher the Yellow Index (YI), the greater the degree of yellowing. If BHT is not used, no yellowing occurs. Table 1 lists the values obtained in using this standard testing procedure on Examples 1, 2 and 3.

TABLE 1

|  | Average Particle Size ($\mu$) | YI | Visual Obs. |
|---|---|---|---|
| Ex. 1 Pearl TiO$_2$ Coated Mica - Untreated | 10 | 37.4 | Yellow |
| Ex. 1 Pearl TiO$_2$ Coated Mica - Treated | 10 | 8.9 | No Yellowing |
| Ex. 2 Pearl TiO$_2$ Coated Mica - Untreated | 25 | 43.4 | Yellow |
| Ex. 2 Pearl TiO$_2$ Coated Mica - Treated | 25 | 6.2 | No Yellowing |
| Ex. 3 Pearl TiO$_2$ Coated Mica - Untreated | 10 | 29.9 | Yellow |
| Ex. 3 Pearl TiO$_2$ Coated Mica - Treated | 10 | 1.5 | No Yellowing |

Although the present invention has been described in relation to particular embodiments thereof, many other variations and modifications and other uses will become apparent to those skilled in the art.

What is claimed is:

1. A composition comprising:
   a polyolefin;
   an antioxidant; and
   mica particles having on a surface thereof a first layer of a coating consisting of titanium dioxide and a second layer of a calcined coating consisting of silica and alumina thereon.

2. A composition according to claim 1, wherein the antioxidant is butylated hydroxytoluene.

3. A composition according to claim 1, wherein the polyolefin is polyethylene.

4. A composition according to claim 1, wherein the coating of silica and alumina comprises of about 1.5% to 4.0% of silicon and of about 0.5% to 2.0% of aluminum, based on the weight of the coated mica.

5. A composition according to claim 1, wherein the coating of silica and alumina comprises of about 1.5% to 3.0% of silicon and of about 0.8% to 1.5% of aluminum, based on the weight of the coated mica.

6. A composition according to claim 1, wherein the coating of silica and alumina is calcined at a temperature of about 800° to 950° C.

7. A composition according to claim 1, wherein the coating of silica and alumina is calcined at a temperature of about 825° to 875° C.

8. A composition according to claim 1, wherein the coating of titanium dioxide is the rutile form.

9. A composition according to claim 1, wherein the coating of titanium dioxide is the anatase form.

10. An antioxidant containing composition comprising, in addition to the antioxidant, titanium dioxide-coated mica particles, the titanium dioxide-coated mica particles having a layer consisting of silica and alumina calcined thereon.

11. A micaceous pigment for preventing yellowing in antioxidant containing polyolefin compositions, the pigment being mica particles having on a surface thereof a first layer of a coating consisting of titanium dioxide and a second layer of a coating consisting of silica and alumina; the second layer being calcined thereon.

12. A process for preventing the yellowing of an antioxidant containing polyolefin composition, which comprises mixing the polyolefin with mica particles having on a surface thereof a first layer of a coating consisting of titanium dioxide and a second layer of a coating consisting of silica and alumina, the second layer being calcined thereon, and an antioxidant.

13. The process according to claim 12, further comprising tile step of preparing the polyolefin composition by adding an antioxidant to the polyolefin.

14. The process according to claim 12, wherein the antioxidant is butylated hydroxytoluene.

15. The process according to claim 12, further comprising the step of providing the second layer of silica and alumina on the first layer of titanium dioxide.

16. The process according to claim 12, further comprising the step of calcining the second layer of silica and alumina.

17. The process according to claim 12, further comprising the step of providing a layer of titanium dioxide on the mica particles.

18. The process according to claim 12, further comprising the step of preparing a polyolefin composition wherein the polyolefin is polyethylene.

19. The process according to claim 12, further comprising the step of providing a layer of a coating of silica and alumina.

20. The process according to claim 19, wherein the step of providing a layer of silica and alumina comprises adding the silica before the alumina.

21. The process according to claim 19, wherein the step of providing a layer of silica and alumina comprises adding the silica after the alumina.

22. The process according to claim 12, wherein the first layer of a coating of titanium dioxide is calcined before calcining the second layer of silica and alumina.

23. The process according to claim 12, wherein the first layer of coating of titanium dioxide is calcined with the second layer of silica and alumina.

* * * * *